(No Model.)

W. M. DEUTSCH.
FILTER.

No. 482,436. Patented Sept. 13, 1892.

Attest:
Geo. H. Britts.
William H. Kennedy.

Inventor:
William M. Deutsch
by
Philipp Munson & Phelps
Attys

UNITED STATES PATENT OFFICE.

WILLIAM M. DEUTSCH, OF ELIZABETH, NEW JERSEY.

FILTER.

SPECIFICATION forming part of Letters Patent No. 482,436, dated September 13, 1892.

Application filed April 19, 1889. Serial No. 307,812. (No model.)

*To all whom it may concern:*

Be it known that I, WILLIAM M. DEUTSCH, a citizen of the United States, residing at Elizabeth, county of Union, and State of New Jersey, have invented certain new and useful Improvements in Filters, fully described and represented in the following specification and the accompanying drawings, forming a part of the same.

This invention relates to improvements in filters.

With discharge-pipes as heretofore constructed and arranged in the filter great difficulty has been experienced in cleansing the filter of the filth accumulating below the discharge-pipe, its complete removal by the reverse current being practically impossible. This difficulty I overcome by embedding the lower portion of the discharge-pipe in a body of cement or other suitable material and providing said pipe with openings or slits upon its exposed or upper portion, the material in which the pipe is embedded preventing the accumulation of filth below the discharge-pipe and the reverse current issuing through these openings in streams horizontally and vertically, removing all of the filth accumulated about the discharge-pipe during the filtering operation.

A full understanding of the invention can best be given by an illustration and a detailed description of a discharge-pipe for a filter constructed according to the present invention. Such description will therefore be given, reference being had to the accompanying drawings, in which—

Figure 1:
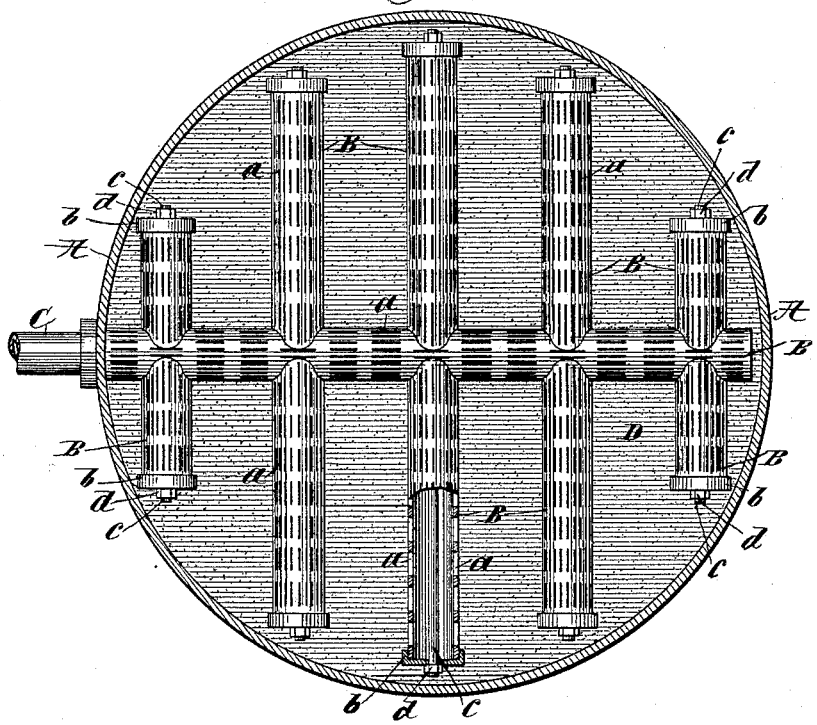
Figure 2:
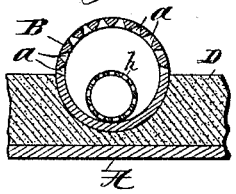

Figure 1 is a horizontal section of an ordinary filter, showing the discharge-pipe in plan view, a portion of one of the branches of the pipe being broken away to illustrate an improved means of closing the ends of the discharge-pipe; and Fig. 2 is a cross-section of a modified form of discharge-pipe, which will be hereinafter referred to.

Referring to said figures, it is to be understood that A represents a filter-body of any suitable construction, and B the discharge-pipes located at or near the bottom of the filter-bed to receive the water after it has passed through the bed and conduct it to the main outlet-pipe C. The pipes B are arranged in substantially the manner of the pipes in the well-known "National" filter. The pipes B, instead of being provided with round or polygonal perforations, through which the water passes to enter the pipes, are preferably provided with slits *a* of considerable length, said slits being, as best shown in Fig. 2, exceedingly narrow where they open outward through the pipes, so as to prevent the passage through them of the finer particles of the granular material constituting the bed, but flaring inward, so as to be of considerable width where they open to the interior of the pipe. The apertures formed by the slits upon the outside of the pipe are so narrow as to effectually prevent the passage through them of any of the material of the filter-bed; but it is found that by reason of the length of the slits and their peculiar formation, as described, all tendency toward their becoming clogged by the wedging into them by the finer particles of the bed is avoided. The inward flare given to the slits also permits any fibrous or stringy material which may be carried into the filter by the water and gradually worked through the bed and into the slits to be readily washed back out of the slits by the reverse current of water in the operation of washing the bed. Though the pipe B has been described as a discharge-pipe, it is manifest that it can also be used as a washing-pipe and that this function of washing may be its sole function, or may, as in the present construction, be additional to its function as a discharge-pipe.

As shown, the discharge-pipe B has its lower portion embedded in cement or other suitable material D and is provided upon its exposed or upper portion with openings or with the slits *a*, as shown, through which the water upon the reversal of the current to wash the bed passes horizontally and upwardly into the filter. By this arrangement the accumulation of filth beneath the discharge-pipe is prevented, and the cleansing of the filter-bed by the reversal of the current through the discharge-pipe thereby rendered perfect and being easily accomplished. Instead of providing the discharge-pipe with the slits *a*, it may be provided with simple openings, if desired, in which case it may, and preferably will, also be provided with an inner pipe *h*, as shown in Fig. 2, the space between the two pipes B *h* being filled with moderately-fine gravel or similar material, as shown in my prior Letters Patent, No. 355,004.

In the drawings (see Fig. 1) I have also shown an improved means for closing the ends of the branch or cross pipes of the discharge or washing pipes. Aside from the objection to the expense which is involved in permanently closing the ends of these pipes by means of heads made integral with or permanently secured to the ends of the pipes it is desirable that the ends of these pipes should be so closed that the closure can be removed when occasion requires, so as to obtain access to the interior of the pipes. For this purpose the ends of the pipes are provided with removable flanged heads *b*, which fit snugly over the ends of the pipes and are held in position by means of tie-rods *c*, which pass lengthwise through the pipes from end to end and through the heads, where they are provided with nuts *d*, which can be tightened up so as to hold the two heads snugly against the ends of the pipe.

What I claim is—

1. In a filter, the combination of a bed of cement or other suitable material within the filter-casing and a discharge or washing pipe embedded therein and provided with openings upon its exposed portions, substantially as described.

2. In a filter, the combination of a bed of cement or other suitable material within the filter-casing, a discharge or washing pipe embedded therein and provided with openings upon its exposed portions, and a second perforated pipe within said pipe, substantially as described.

In testimony whereof I have hereunto set my hand in the presence of two subscribing witnesses.

WILLIAM M. DEUTSCH.

Witnesses:
T. H. PALMER,
J. J. KENNEDY.